(12) United States Patent
Kaplan et al.

(10) Patent No.: US 12,452,038 B2
(45) Date of Patent: Oct. 21, 2025

(54) SECURE COMPUTING ENVIRONMENTS WITH KEY MANAGEMENT FOR PRIVATE COMMUNICATION OVER DATA NETWORKS

(71) Applicant: Enclave Markets Inc., San Francisco, CA (US)

(72) Inventors: Michael Edmond Kaplan, Brooklyn, NY (US); Bernard Wong, Waterloo (CA)

(73) Assignee: Enclave Markets Inc., San Francisco, CA (US)

( * ) Notice: Subject to any disclaimer, the term of this patent is extended or adjusted under 35 U.S.C. 154(b) by 0 days.

(21) Appl. No.: 18/492,372

(22) Filed: Oct. 23, 2023

(65) Prior Publication Data

US 2024/0243905 A1  Jul. 18, 2024

Related U.S. Application Data

(63) Continuation of application No. 18/154,554, filed on Jan. 13, 2023, now Pat. No. 11,831,760.

(51) Int. Cl.
*H04L 9/08* (2006.01)
*H04L 9/32* (2006.01)
(52) U.S. Cl.
CPC .......... *H04L 9/0825* (2013.01); *H04L 9/0866* (2013.01); *H04L 9/3263* (2013.01)
(58) Field of Classification Search
None
See application file for complete search history.

(56) References Cited

U.S. PATENT DOCUMENTS

| | | | |
|---|---|---|---|
| 9,887,975 B1 | 2/2018 | Gifford et al. | |
| 10,103,889 B2 | 10/2018 | Bronk | |
| 10,373,167 B2 | 8/2019 | Zovi et al. | |
| 10,462,135 B2 | 10/2019 | Varadarajan et al. | |
| 10,546,302 B2 | 1/2020 | Zovi et al. | |
| 2018/0241572 A1 | 8/2018 | Miele et al. | |
| 2018/0351941 A1* | 12/2018 | Chhabra | H04L 63/08 |
| 2020/0186350 A1 | 6/2020 | Wentz et al. | |
| 2020/0244681 A1 | 7/2020 | Klawe et al. | |
| 2022/0321362 A1* | 10/2022 | Konda | G06F 21/57 |

* cited by examiner

*Primary Examiner* — Brandon Hoffman
(74) *Attorney, Agent, or Firm* — Barnes & Thornburg LLP

(57) ABSTRACT

A secure module can be configured to: provide the trusted execution environment; and load secure-software for processing in the trusted execution environment to perform operations. The operations can include generating a private key and a corresponding public key; maintaining the private key in the trusted execution environment; receiving at least one attestation request from at least one attestation server; responding to the received attestation requests with attestation responses generated with the private key; initiating encrypted connections with client devices using the private key, the encrypted connections having an endpoint within the trusted execution environment such that contents of the encrypted connections are secure from observation and manipulation by other operations outside of the secure module and outside of the client devices; and communicating data with the client devices through the encrypted connections.

20 Claims, 8 Drawing Sheets

SECURE COMPUTING ENVIRONMENTS WITH KEY MANAGEMENT FOR PRIVATE COMMUNICATION OVER DATA NETWORKS

CROSS-REFERENCE TO RELATED APPLICATIONS

This application is a continuation of U.S. patent application Ser. No. 18/154,554, filed Jan. 13, 2023 and issued as U.S. Pat. No. 11,831,760 on Nov. 28, 2023, which is incorporated herein by reference in its entirety.

FIELD

The present document generally relates to secure computing environments and key management technology for network communication with clients of the secure computing environments.

BACKGROUND

Secure computing environments have been developed, which can protect various aspects of processes within the secure computing environments from observation, detection, or manipulation by third party actors (e.g., malware). For example, secure computing enclaves have been developed that include hardware components of computing devices that provide operations to execute code in an encrypted environment that can shield the operations and/or data being processed from third party actors. For instance, a computing device can include one or more specialized processors that are configured to allow user-level and/or operating system code to define private and encrypted regions of memory, sometimes called enclaves.

Data communication over data networks between two machines can be protected by cryptographic techniques to hide the data being passed by the machines. In some cases, a client and server can exchange information after exchanging or agreeing on an encryption key and a cypher to use when encrypting data. Many web browsers in use support this type of encrypted communication, as do other types of applications.

SUMMARY

The disclosed technology is generally directed to secure and trustworthy computing environments in which a client wishes to have secure communication with an application or code that is executed within a secure environment (e.g., enclave) of a server. When the secure environment is hosted on a typical server (i.e. a server with operations that are not demonstrated to respect private data, which is the case for many servers even if they are not performing any malicious activities), this technology can nevertheless prevent the server from accessing the plaintext of communications between clients and those processes in the secure environment.

Code published and validated by the client—or by a source that the client trusts—can include instructions to generate a random public-private key pair. The code can preserve the private key inside the secure computing environment. Then, clients can be sure that the private key will never be transmitted outside of the secure computing environment, because validation of the code can include a check to ensure that this key is held correctly in the secure environment. The client may then initiate a secure data connection using the public key of the pair, sending the initiation message to the server hosting the secure computing environment. The server's processes outside of the secure environment, not having access to the private key, are thus unable to 'spoof' the secure environment (e.g., maliciously respond to the request pretending to be operating within the enclave to gain access to the plaintext of the communications). Instead, the server passes the encrypted data into the secure computing environment where it can be decrypted and acted upon. In order to communicate with the processes in the enclave, the client can access the public key from a certificate authority and then initiate, for example, a Transport Layer Security (TLS) or Secure Sockets Layer (SSL) connection with the public key.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for providing secure data transfer with a trusted execution environment. The system includes a host server that may include: one or more processors, computer memory, and a secure module configured to: provide the trusted execution environment within which processing is secure from observation and manipulation by other operations outside of the secure module; and load secure-software for processing in the trusted execution environment, the secure-software comprising instructions that, when executed in the trusted execution environment, cause the secure module to perform operations. The operations can include generating a private key and a corresponding public key; maintaining the private key in the trusted execution environment; receiving at least one attestation request from at least one attestation server; responding to the received attestation requests with attestation responses generated with the private key; initiating encrypted connections with client devices using the private key, the encrypted connections having an endpoint within the trusted execution environment such that contents of the encrypted connections are secure from observation and manipulation by other operations outside of the secure module and outside of the client devices; and communicating data with the client devices through the encrypted connections. Other embodiments of this aspect include corresponding computer systems, apparatus, and computer programs recorded on one or more computer storage devices, each configured to perform the actions of the methods.

Implementations may include one or more of the following features. The system where: the operations further may include sending the public key to a certifying server; and the system further may include the certifying server configured to: receive the public key; verify ownership of the host server; responsive to verifying ownership of the host server, generate a certificate for the host server using the public key; and serving the certificate. The system may include one or more client devices configured to: receive the certificate from the host server; and requesting, using the certificate, initiation of at least one of the encrypted connections. The system further may include an attestation server configured to: receive the certificate from the host server; send at least one attestation request; receive the attestation responses; verify the attestation response; and send, to the client devices, attestations for the secure module. The system further may include a publishing server configured to: serve an expected-fingerprint for the secure-software, the expected-fingerprint being may include a data object generated based on binary data of the secure-software; the attestation server is further configured to: send, to the secure module, a fingerprint request; receive, from the secure module, a fingerprint response may include an actual-fingerprint; and where verifying the attestation response further may include determining that the actual-fingerprint matches the expected-fingerprint; and the secure module is further configured to: receive, from the attestation server, the fingerprint request; generate the actual-fingerprint based on binary data of the secure-software; and send, to the attestation server, the fingerprint response may include the actual-fingerprint. The attestation server is further configured to fail verification of the attestation response when the certificate fails a check or when the actual-fingerprint does not match the expected-fingerprint, or when an invalid trusted execution environment is used by the host server. The publishing server is further configured to serve the secure-software to the secure server. The publishing server is the attestation server. The system the system may include a plurality of attestation servers. Implementations of the described techniques may include hardware, a method or process, or computer software on a computer-accessible medium.

One or more advantages can be recognized from various implementations of the disclosed technology, systems, and methods. For example, secure communications can be provided within a computing environment, which can protect from computer-based attacks such as man-in-the-middle attacks. Operations can be performed using existing certificate infrastructure, allowing for faster and less disruptive implementation of technology requiring updates or changes to typical certificate operations.

Other features, aspects and potential advantages will be apparent from the accompanying description and figures.

DESCRIPTION OF DRAWINGS

Like reference symbols in the various drawings indicate like elements.

DETAILED DESCRIPTION

The disclosed technology is generally directed to secure software running in a secure module of a server, with features to maintain private keys to ensure communication with client devices is protected from inspection by the server. By creating secure endpoints (e.g., TLS or SSL) inside of the secure module (e.g., enclave) instead of under the control of the server, the client device can confidently share data with the secure software that the user of the system would not want to share with the server.

Figure 1:
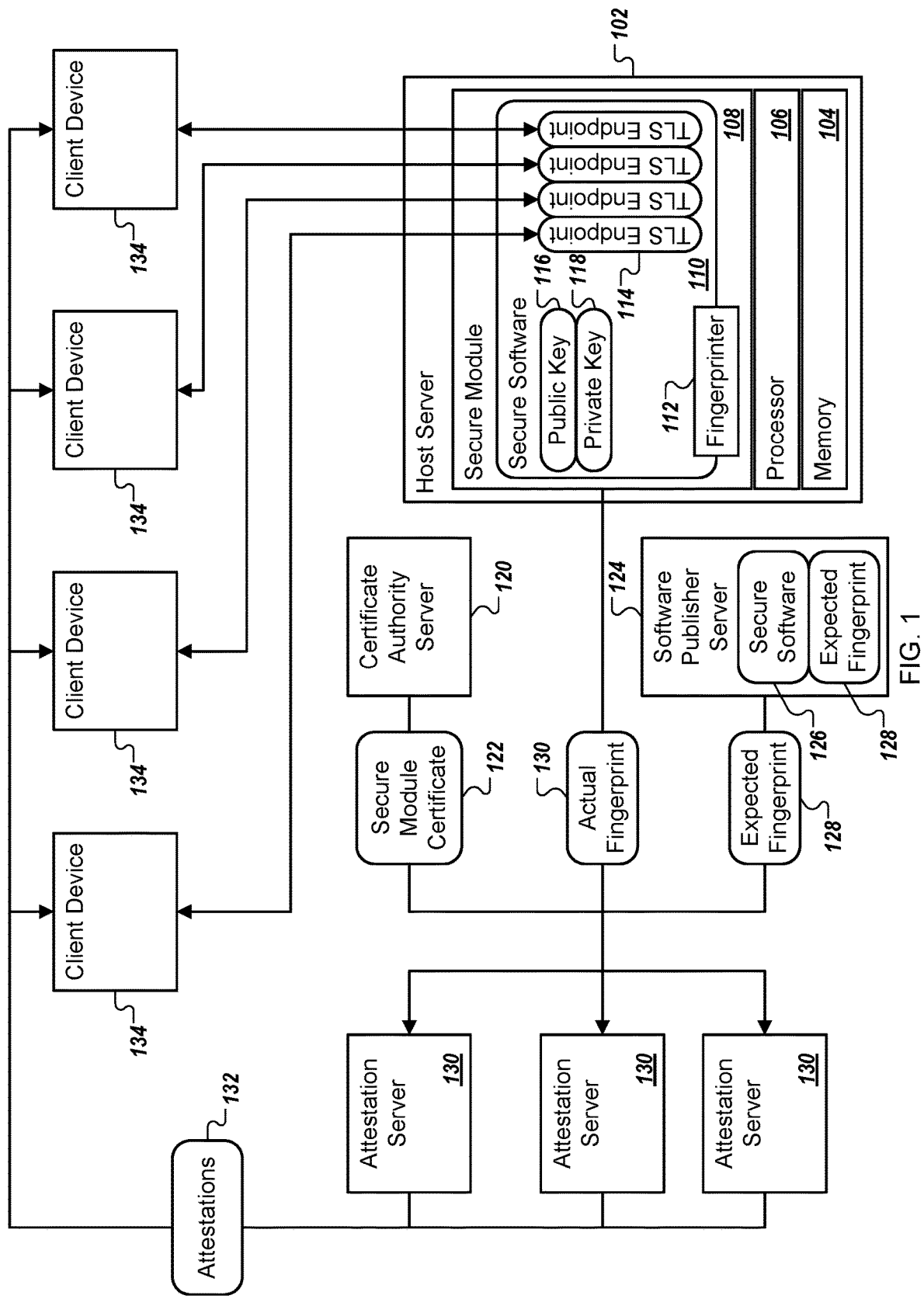
FIG. 1 is a diagram of an example system for providing secure data transfer with a trusted execution environment.

FIG. 1 is a diagram of an example system 100 for providing secure data transfer with a trusted execution environment. In the system 100, a host server 102 can contain a processor 104, memory 106, and a secure module 108 that can provide a trusted execution environment within which processing is secure from observation and manipulation by other operations outside of the secure module. The processor 106 includes one or more processors that can execute instruction stored in the memory 104 and perform one or more computations or operations within the server. The secure module 108 can include an enclave, sandbox, or other environment with features to protect data and processes in the enclave from observation or interference, including hardware features not alterable with software execution.

The secure module 108 can load secure software 110 from a storage system outside of the secure module 108, and data generated with the secure software 110 can be stored in a storage system (e.g., memory 104, which does not have the security assurances of the secure module 110) with encryption provided by the secure module 108. For example, the secure module 108 can be configured to automatically decrypt all data loaded into the secure module 108 and to automatically encrypt all data transferred out of the secure module 108 for persistent storage.

The secure module 112 can include a fingerprinter 112 to generate a fingerprint of the secure software 110. For example, the fingerprinter 112 can, responsive to a request from the host server 102 or from an external source, generate data based on the secure software 100. In one example, the fingerprinter can generate a cryptographic of the secure software 110 that is loaded into the secure module 108 to demonstrate, for example, that the secure software 110 is really running in the secure module 108 and has not been surreptitiously replaced by a malicious actor. The fingerprinter 112 can include hardware components to ensure trusted creation of these fingerprints. To provide secure communication with sources outside of the host server 102, the secure software 110 can create communication endpoints (TLS endpoints in the example shown, but other types of endpoints are possible), for example in response to a communication request received by the secure software 110. The secure software 110 can also be configured to generate one or more public keys 116 and corresponding private keys 118. The public/private key pairs 116/118 can be used to secure the communications through the endpoints 114.

A certificate authority server 120 manages certificates for the secure software 110 and for other agents, including those not shown here. For example, the certificate authority server 120 may provide a secure module certificate 122 (e.g., a TLS/SSL certificate) created with the public key 116 that can allow for the requesting of a TLS connection having an endpoint 114—or any other type of secure communication appropriate for protecting data in transit. In some cases, each endpoint is of the same type (e.g., all TLS, all SSL). In some cases, some of the endpoints are of different types (e.g., some TLS, some SSL).

A software publisher server 124 serves the secure software 110, for example to the host server 102 and/or to other appropriate sources. In addition, the software publisher server 124 can serve an expected fingerprint 128, which can be compared to an actual fingerprint 130 created by the fingerprinter 122. Confirmation that the expected fingerprint 128 and the actual fingerprint 130 match can indicate that the secure module 108 is in fact running the secure software 110 as expected (e.g., and malicious, fraudulent, or outdated software).

Attestation servers 130 can create attestations 132 to document the attestation servers' 130 determinations that the secure module 110 is running the secure software 110 (as opposed to other software). For example, the attestation servers 130 can compare the actual fingerprint 130 to the expected fingerprint 128. If the actual fingerprint 130 does not match the expected fingerprint 128, the attestation servers 130 can refrain from generated the attestations 130 and may optionally generate an error message or take another appropriate action. If the actual fingerprint 130 does match the expected fingerprint 128, the attestation servers can issue attestations 132 documenting the determination that the secure module 110 is running the expected secure software 110. In some cases, the attestations 132 may include other metadata or payload data. For example, the attestations 132 may include a copy of the secure module certificate 122, may include timestamp information, etc. While the publisher server 124 is shown separate from the attestation servers 130, in some configurations one or more servers may operate as both an attestation server 130 and publisher server 124. It will be understood that different components of the system 100 can be owned, administered, and operated by different entities (e.g., people, organizations). For example, by keeping operation of the publication server 124 and attestation servers 130 in the control of a different entity than runs the host server 102, users of the client devices 134 can use attestations from the attestation servers 130 to ensure entities other than those running the host server 102 have verified the authenticity of the secure software 102.

The client devices 134 can receive the attestations to verify that the secure module is running the expected security software 110. Once verified, the client devices can initiate cryptographically secure data communications with the secure software, creating the TLS endpoints 114 that protect the client devices data from eavesdropping or man-in-the-middle attacks.

The system 100 can be used for a variety of purposes in which one or more users of client devices 134 wish to have secure communication with trustworthy software that is running remote from the client devices 134. One possible use case involves the running and maintaining of cryptocurrency exchanges within secure modules like the secure module 108. Such an exchange can be configured to convert and exchange currency in a transaction. For example, the exchange can convert Eth from one user's account to Bitcoin in another user's account. Therefore, when client devices 134 make requests to perform buy or sell orders, the asset pair currency exchange in the secure module 108 can complete the requests within the secure module 108. The exchange can receive user data (e.g., user accounts), which are associated with each of the users that make requests from the client devices 134 to transact via the enclave exchange. Users can transact with each other even if they have different digital assets on different blockchains. One advantage of this technology is that the client devices 134 can interact with other elements using standard web browsers using standard certificate operations. While some implementations can be created in which custom web browsers (or non-web browser application) interact with the system 100, it is also possible to create implementations that operate with any web browser from any vendor or developer that conforms to standard, universal protocols.

These secure-module-based exchanges can provide for reconciling and matching transactions faster than traditional blockchain technologies. Using the secure module's 110 environment, users can transact with different digital assets across different chains, including but not limited to Bitcoin, Etherum, ERC20 tokens, and assets from other chains such as AVAX. The users can be buyers and sellers of cryptocurrencies who can trust that the secure software 110, whose behavior is known or approved of by a trusted authority, can access their private data while other computing systems and elements are unable to do so.

Figure 2:
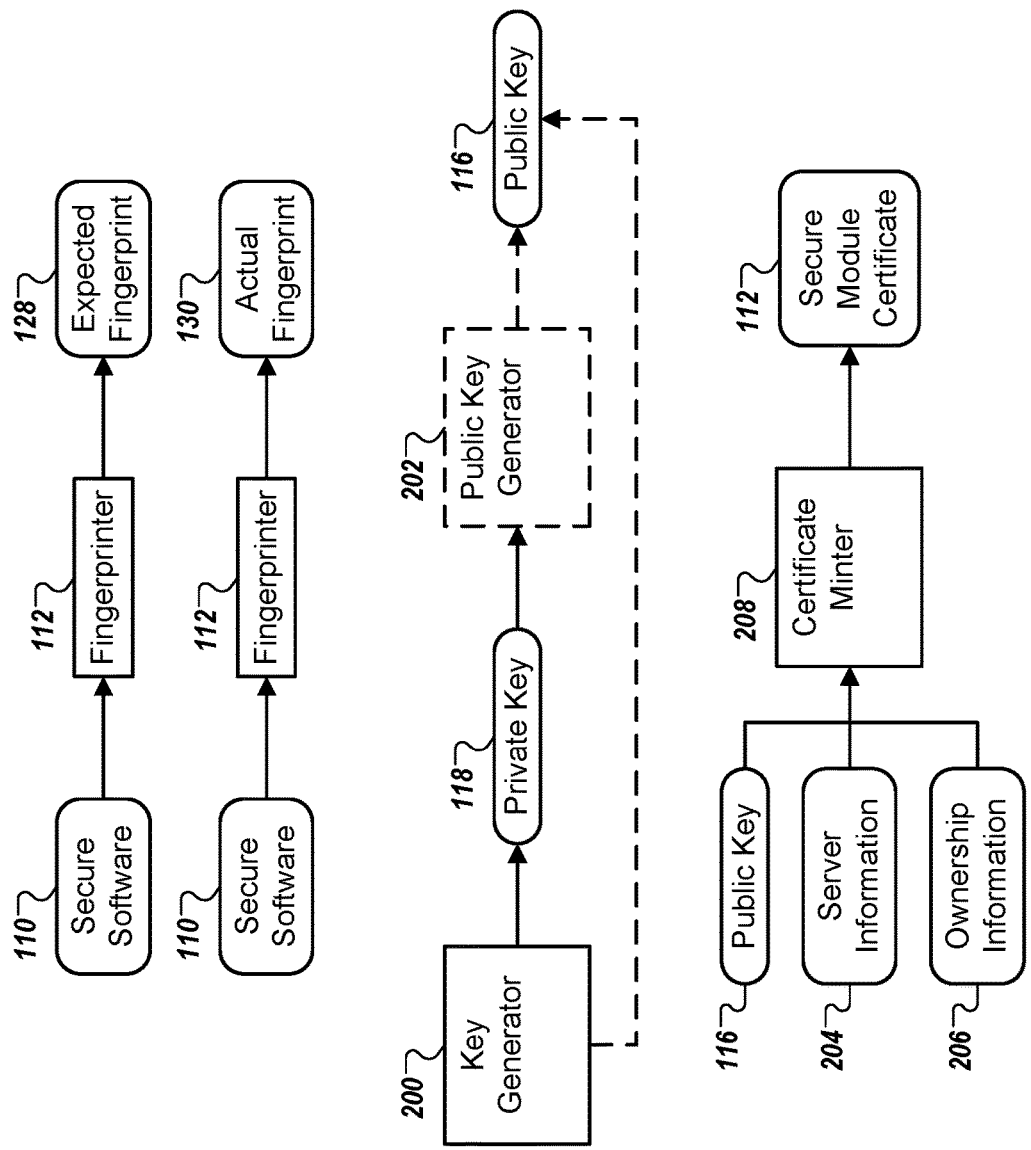
FIG. 2 is a diagram of example data that can be used in providing secure data transfer with a trusted execution environment.
Figure 3:
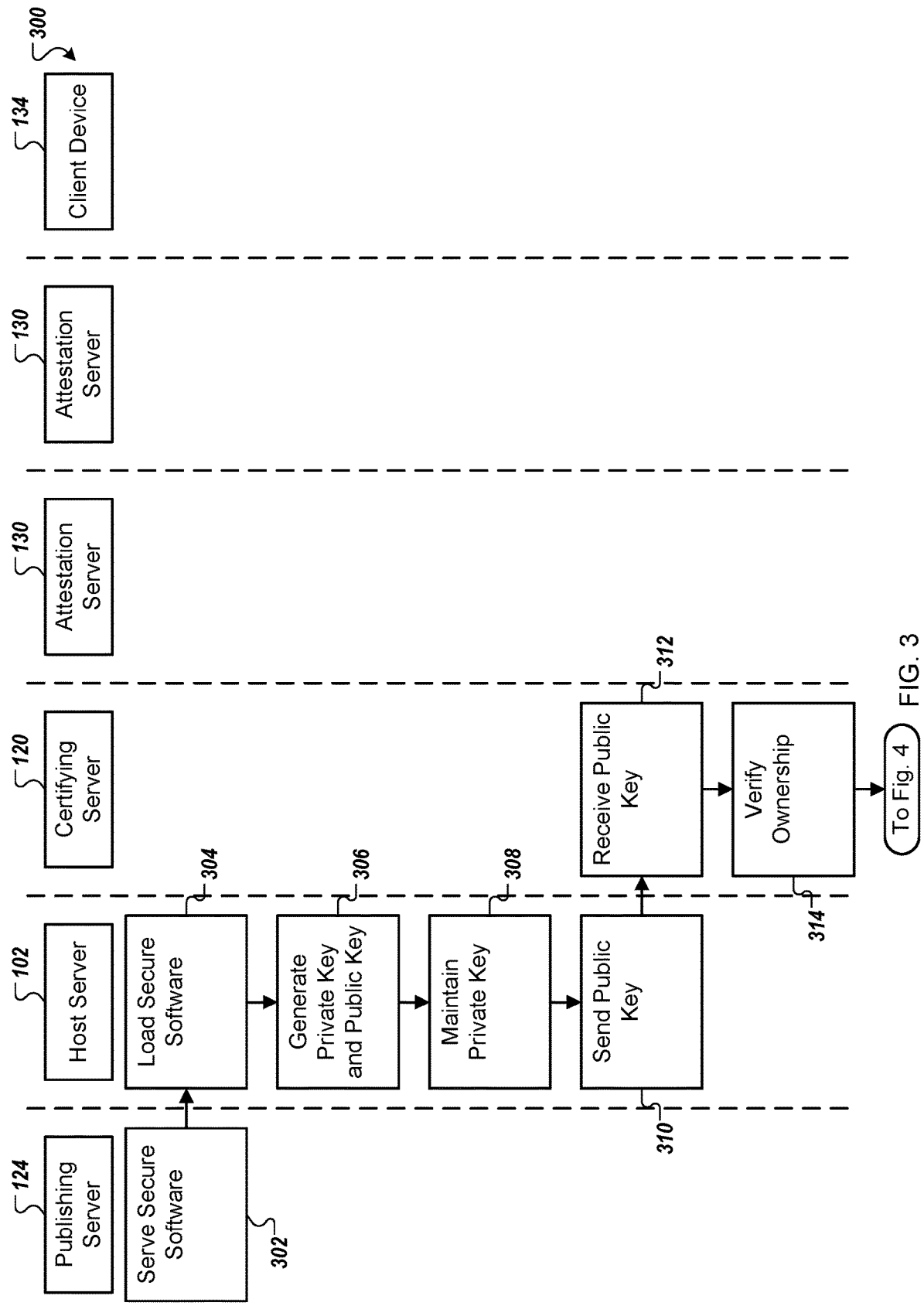
FIGS. 3-6 are swimlane diagrams of an example process of providing secure data transfer with a trusted execution environment.
Figure 4:
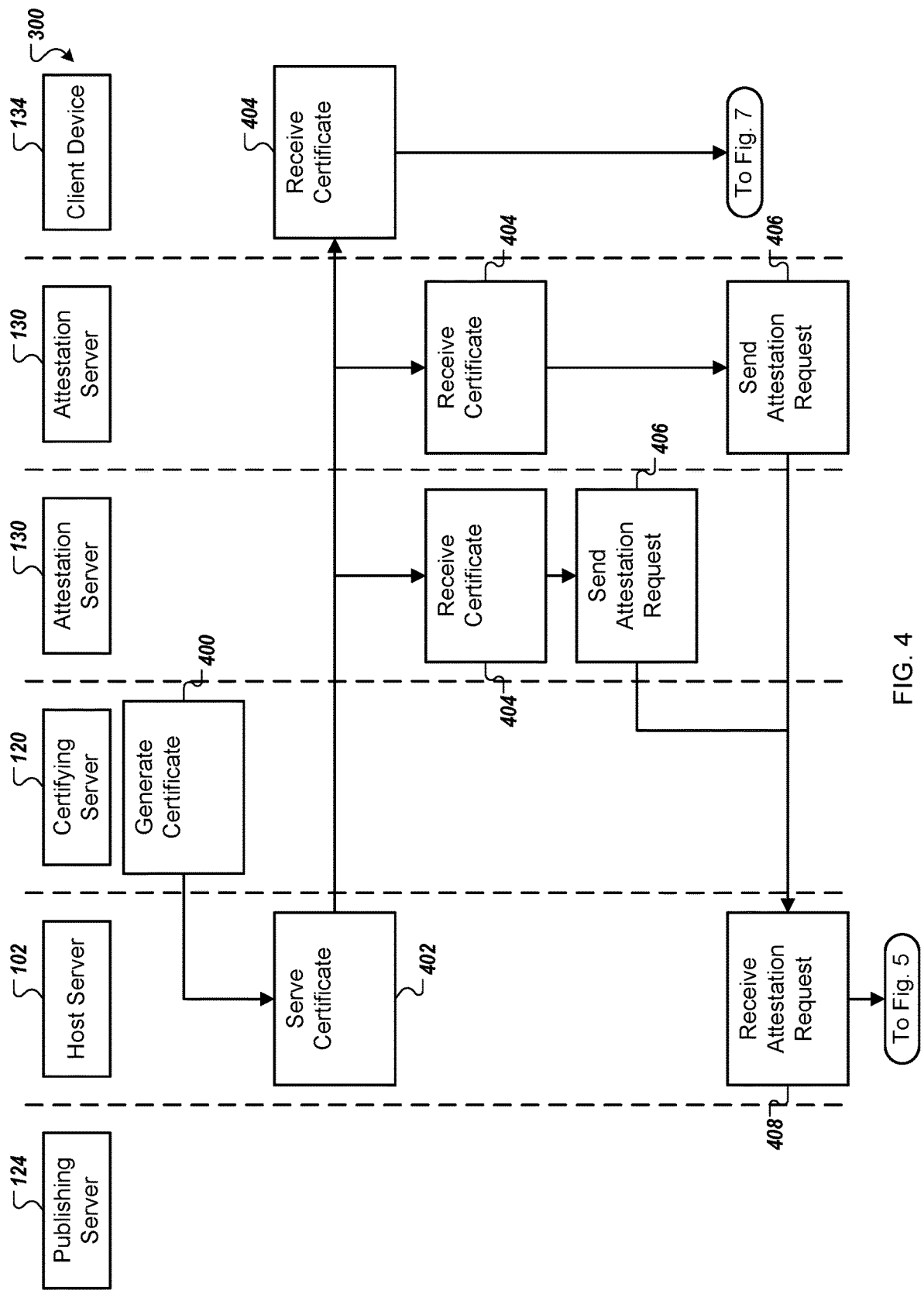
Figure 5:
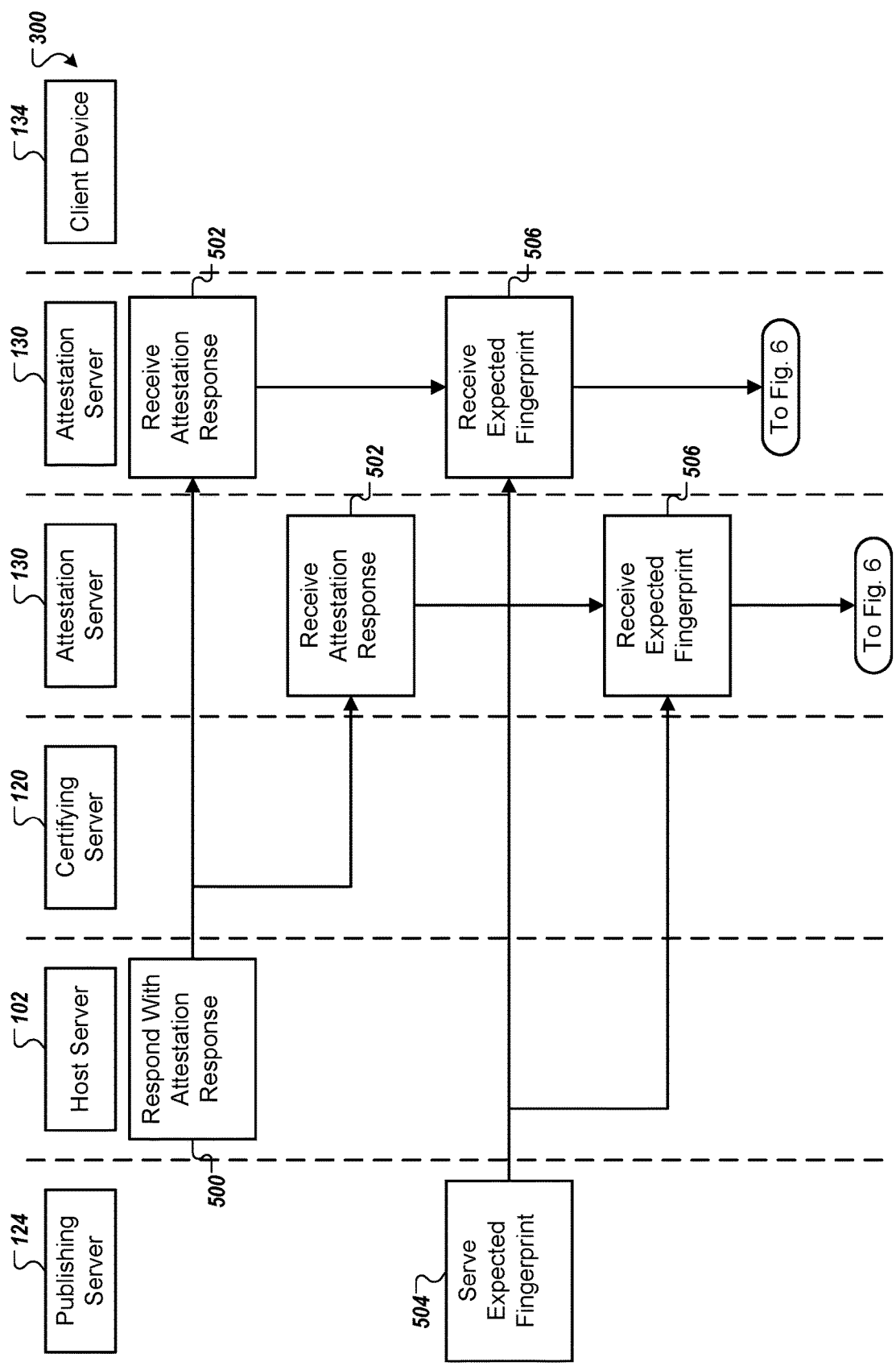
Figure 6:
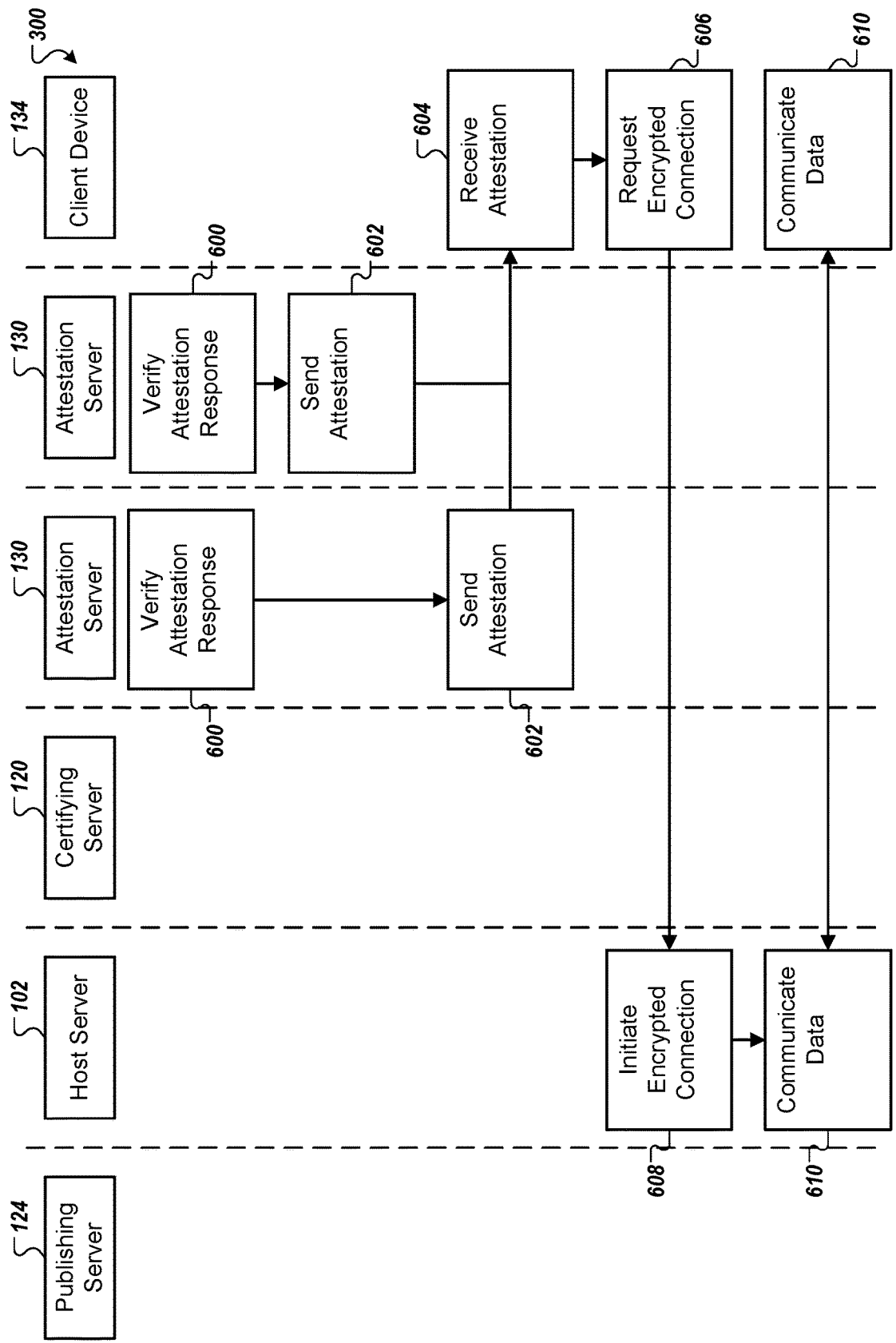

FIG. 2 is a diagram of example data that can be used in providing secure data transfer with a trusted execution environment. For example, the data shown in FIG. 2 can be used by the system 100 of FIG. 1 and therefore will use the system 100 as the basis of an explanation.

Secure software 110 (shown here twice) can include computer-executable instructions that can be loaded into a secure module such as secure module 108 and executed. The secure software 110 can instructions that, when executed in a trusted execution environment of the secure module 108, cause the secure module 108 to perform operations The fingerprinter 112 can create identifying data based on the secure software 110. As explained elsewhere, a copy of the secure software 110 can be fingerprinted when the secure software 110 is being validated, and that can be used as the fingerprint 128. Later, the fingerprinter 112 (either the same fingerprinter 112 or another fingerprinter 112) can fingerprint software loaded into the secure module 108 to create the actual fingerprint 130. If that software is the secure software 110, the actual fingerprint 130 will be a match for the expected fingerprint (e.g., they both contain the same hash value generated from the same input data and using the same hashing algorithm).

A key generator 200 can include one or more hardware and/or software components of the secure module 108 and/or the host server 102. The key generator 200 can be used as part of the operations undertaken to generate the public key 116 and the private key 118. For example, the key generator 200 can generate a large pseudorandom or true-random string of binary digits and apply that string as an input to a function that generates one or both of the keys 116 and/or 118. In some cases, the key generator 200 can directly generate the private key 118 and the public key 116. In some cases, the key generator 200 generates only one key (e.g., 118) and another element (e.g., public key generator 202) can generate the other key.

A certificate minter 208 may be an element of the certificate authority server 120 or may be independent of the certificate authority server 120. The certificate minter can mint the secure module certificate 1 based on data about the execution of the secure software 110 in the secure module 108. This can include a copy of the public key 116, server information 204 (e.g., domain name or universal resource locator, certificate extensions to be used for communication with the secure software 110, etc), and ownership information 206 (e.g., metadata or payload data showing control of the host server 102 and/or the secure module 108). The secure module certificate 122 can include one or more certificates or other data that allows for secure communication to the secure software 110 running in the security module 108. This can include, for example, a copy of the public key 116 in an X.509 certificate.

FIGS. 3-7 are swimlane diagrams of an example process 300 of providing secure data transfer with a trusted execution environment. In some cases, the system 100 can be used to perform the process 300. Therefore, elements of the system 100 will be used in the description of the process 300, although other systems may be used to perform the process 300 or similar processes.

The publishing server serves 302 the secure software 110 to the host server 102. For example, a software package can be developed to run in the secure module 108 and perform a useful activity for client devices 134 and/or users of the client devices. This may include the use and manipulation of sensitive data such as financial data, personally identifying data, health data, etc. To protect this data, the software package may ensure that the sensitive data generated is never exposed outside of the secure module 108 in cleartext form.

Depending on the configuration of the system 100, the software publishing server 124 may serve the secure software 110 to other requests or may deny requests to serve the secure software 110 to other requests. For example, the developers of the secure software may wish to limit distribution of the code for the secure software 110 and deny service to the attestation servers 130, the certificate authority 120, client devices 134, etc.

The host server 102 loads 204 the secure software 110 for processing in the trusted execution environment 108. For example, the host server 102 may store the secure software 110 in a particular area of the memory 104 and send a message to the secure module 108 to read that memory address and being execution, storage in another location within the secure module 108, etc.

The host server 102 generates 306 a private key 118 and a corresponding public key 116 and the host server 102 maintains 308 the private key 118 in the trusted execution environment of the secure module 108. For example, the secure module can run the key generator 200 (and other elements such as the public key generator 202 or a private key generator) to create the public key 116 and the private key 118. The secure software 110 running in the secure module 108 may use these keys 116 and 118. Then, when they are to be saved for long term storage, they may be encrypted into different data (i.e. cyphertext) before the different data is stored to the memory 104. For example, to maintain the private key 118, the host server 108 can encrypt the key using a secret that is specific to hardware (e.g., a CPU, a read-only memory module) of the host server 102. This encrypted private key 118 can be split and backed up to other machines (e.g., the attestation servers 130), allowing the reconstruction of the private key 118 at a later time (e.g., see FIG. 7).

The host server 102 sends 310 the public key 116 to a certifying server 120 and the certifying server 120 receives 312 the public key 116. For example, the public key 116 can be exposed by the secure software 110 for use by other elements of the system 100. As the private key 118 is not similarly exposed, the public key 116 can be used to create encrypted messages to the secure software 110 that cannot be decrypted by any element 100 other than the secure software 110. This private key counterpart can be generated and accessed only by the process running within the secure module 108. By not exposing his private key (even not to an administrator user of the host server 102) the domain used by the service can be protected from malicious appropriation.

The certifying server 120 verifies 314 ownership of the host server 102. Responsive to verifying ownership of the host server 102, the certifying server 120 generates 400 a certificate 122 for the host server 102 using the public key 116. For example, the certifying server 120 can use the public key 116, the server information 204, and/or the ownership information 206 to determine that the request is authorized according to the rules used by the certifying server 120. This can include determining that a server at a particular domain has modified a data file, accessing and examining ownership records, receiving authorization from a user associated with the certificate authority who has investigated this ownership, etc. Then, the certifying server 120 can use the certificate minter to generate the certificate 122 and transmit the certificate 122 to the host server 102.

The host server 102 serves 402 the certificate. The attestation servers 130 and the client devices 134 receive 404 the certificate 122 from the attestation server 130. For example, these elements of the system may each individually and separately request the certificate 122, or the certificate authority server 120 can initiate transmission without receiving such requests.

The attestation servers 130 send 406 attestation requests to the host server 102. The host server 102 receives 408 the attestation request from at least one attestation server 130. For example, the attestation requests may be used to request information from the host server 102 such that the attestation servers 130 can each independently determine if the secure module 108 is running the secure software 110 or some other, unexpected software.

The host server 102 responds 500 to the received attestation requests with attestation responses generated with the private key 118. The attestation servers 130 receive 502 attestation responses. For example, the host server 102 generates the actual-fingerprint 130 based on binary data of the secure-software 110 and sends the response 500 including the actual-fingerprint 130.

The publishing server 124 serves 504 an expected-fingerprint 128 for the secure-software 110 and the attestation servers 130 receive the expected-fingerprint 128. For example, the expected-fingerprint being comprising of a data object generated based on binary data of the secure-software. This can include, for example, a hash of the secure software 110.

The attestation servers 130 are configured to verify 600 the attestation response. For example, the attestation servers 130 can compare the actual fingerprint 130 to the expected fingerprint 128. Verifying the attestation response can include determining that the actual-fingerprint matches the expected-fingerprint and passing verification upon determination of a match and failing when the certificate fails a check or when the actual-fingerprint does not match the expected-fingerprint The attestation servers 130 are configured to send 602, to the client devices 134, attestations for the secure module 108. For example, upon successful verification, the attestation servers 130 can initiate a transfer or respond to requests from the client devices 134 by responding with a transfer of attestations 132 that document the successful verification. This can include appropriate payload data and metadata such as a time-stamp of the verification, an expiration time-stamp after which the attestations 132 expires, etc.

The client devices are configured to receive 404 the certificate 122 and receive 604 the attestations and to request 606, using the certificate 122, initiation of at least one encrypted connection with the secure software 110. For example, with this data, the clients 134 may 1) be sure that the expected software (i.e., secure software 110) is being run in the secure module 108 and 2) be sure that their messages to the secure software 110 will not be available to any other element because of the security provided by TLS communications (which, it will be noted, is not theoretically perfect security but has been demonstrated to be sufficient for many real-world applications). Implementations can advantageously be arranged so that the previous remote-attestation operations only need to be performed once to lean and confirm certificate information and demonstrate that private information (e.g., private or secret keys) is never exposed outside of the secure module 108. After that, the client devices can use normal secure connections (e.g., SSL, TLS) and as long as the connection is properly configured and secured with the certificate as presented during attestation, client device can operate with confidence that the connection is encrypted and only the secure module 108 can perform the encryption/decryption with the private information (e.g., private or secure keys).

The host server 102 initiates 608 an encrypted connection. The host server 102 and the client device 134 communicate 610 data through the encrypted connection. For example, the secure software 110 can respond to the requests from the client devices 134 by creating one or more TLS endpoints 114 or other types of endpoints (SSL, CurveCP, Kerberos). This allows for use of encrypted connections with client devices using the private key, the encrypted connections having an endpoint within the trusted execution environment such that contents of the encrypted connections are secure from observation and manipulation by other operations outside of the secure module and outside of the client devices.

Figure 7:
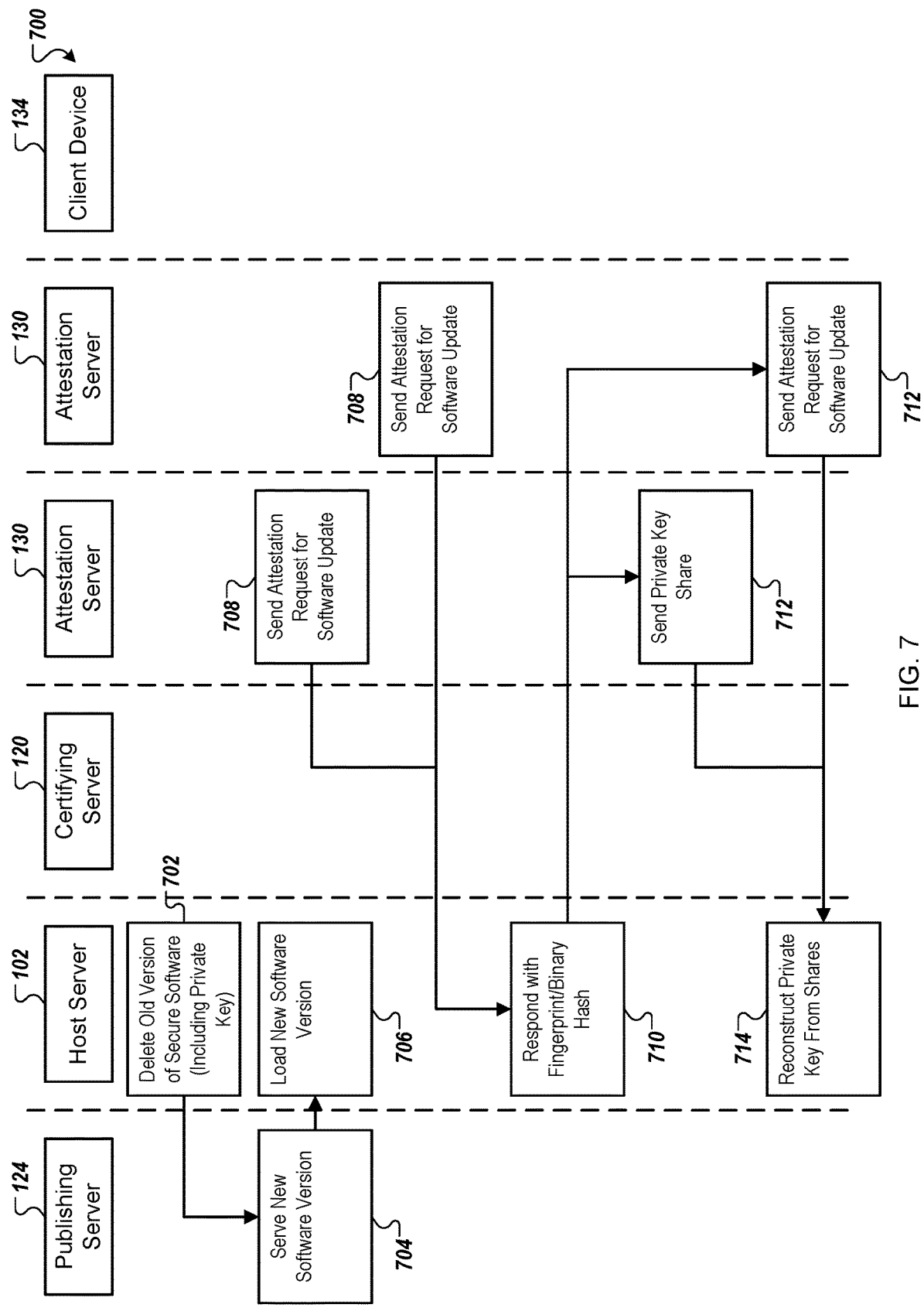
FIG. 7 is a swimlane diagram of an example process for reconstructing private keys after a software upgrade that deletes the private keys from a host server.

FIG. 7 is a swimlane diagram of an example process 700 for reconstructing private keys after a software upgrade that deletes the private keys from a host server. For example, when the host server 102 updates the secure software 110 to a new, known-good version, the private key 118 may be lost, based on technological features of the secure module 108 that ensure security (e.g., preventing exposure of the private key 118). Therefore, the process 700, or a similar process, may be used to maintain the private key in the trusted execution environment, comprising encrypting the private key with a hardware-specific secret for backup and reconstruction as described here.

Each of the attestation servers 130 can be configured to maintain a secret share of the private key 118. These secret shares maintained by the attestation servers 130 can be configured to be used in combination to regenerate the private key 118. For example, the secure software, as part of maintaining the private key 308, can split the data of the private key into shards (e.g., one shard for each attestation server 130), encrypt each shard with a secret that is specific to hardware (e.g., a CPU, a read-only memory module) of the host server 102, and send each encrypted shard to one attestation server 130.

The host server 102 deletes an old version of the secure software, including private keys 702. For example, the operator (e.g. human user) of the host server 102 may determine that the host server 102 should upgrade the secure software 110 to a new version that, for example, increases efficiency, provides new functionality, etc. In another example, the host server 102 may receive a notification that the publishing server 124 has a new version available for upgrade, and initiate the upgrade without specific user input. To make room for the new software, the host server 102 can delete the secure software 110.

The publishing server 124 serves a new version of the software 704. For example, the publishing server 124 can send one or more data files with the new version of secure software 110. As will be appreciated, other examples may include the operation 704 being performed before the operation 702, which may be preferable to limit the length of downtime for the upgrade. However, performing operation 702 before 704 may be preferable to halt the operation of the secure software 110, for example if a software exploit is found.

The host server 102 loads the new version of the software 706. For example, the host server 102 can load the new secure software 110 into the secure module 108. In some cases, this process can include a check or flag to determine if this is a fresh install or a software upgrade. For fresh installs, the secure software can generate the keys as described in 306. For software upgrades, the process 700 can continue.

The attestation servers 103 send attestation requests for the software update 708. For example, the host server 102 can send a notification to the attestation server 130, the publisher server 124 can send a notification to the attestation servers 130, or another operation can be used by the attestation servers 130 to determine that attestation requests should be sent to the host server 102. In some cases, these attestation requests in 708 are the same attestation requests described in 406. In some cases, these attestation requests in 708 are different than the attestation requests in 406. For example, the attestation requests and/or replies may include a data field to indicate if the attestation process is for an upgrade or a fresh install.

The host server 102 response with hash data 710. For example, the host server 102 can request, from the secure module 108, the hash data. In some cases, this hash data is created from a hash of input that includes a fingerprint or other secret that is specific to hardware (e.g., a CPU, a read-only memory module) of the host server 102. In some cases, this hash data is created from a hash of input that includes binary data of the upgraded secure software 110 (e.g., a hash of the entire executable, of a checksum).

The attestation servers 103 send their private key shares to the host server 102. For example, the attestation servers 103 can compare the hash data with expected hash data and, upon a match, determine that the known-good software update that is expected is running in the same secure module 108 as the previous version of the software. Upon such a determination, the attestation servers 103 can send their key share back to the host server 102.

The host server 102 reconstructs the private key(s) from the key shares 714. For example, the host server 102 can provide the key shares to the upgraded secure software 110 in the secure module 108. The secure software 110 can then decrypt each share and reconstruct the private key 118 from the cleartext.

Figure 8:
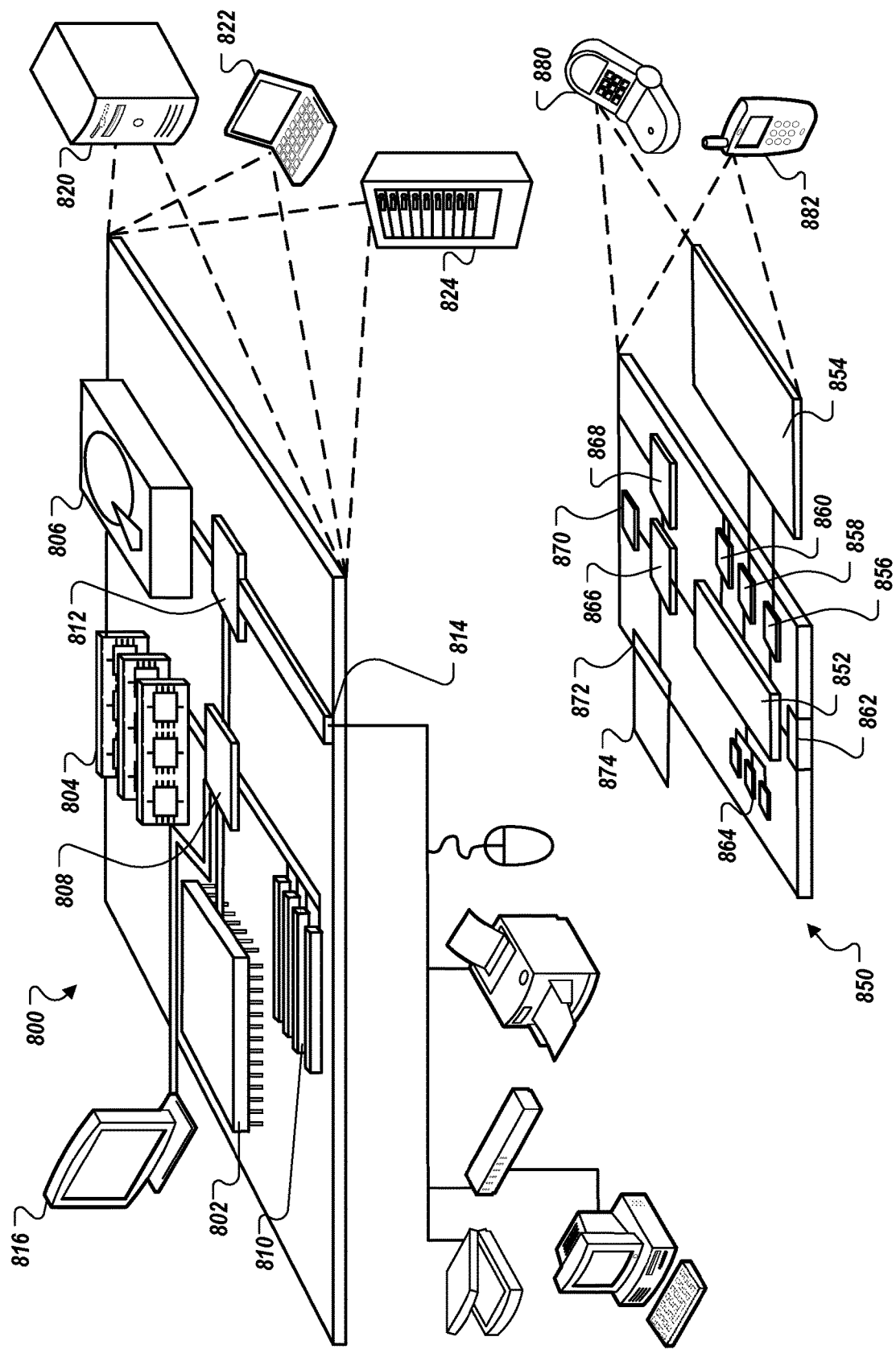
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for providing secure data transfer with a trusted execution environment that executes secure-software, the system comprising:
a host server comprising one or more processors, computer memory, and a secure module configured to (i) provide the trusted execution environment within which processing is secure from observation and manipulation by other operations outside of the secure module, and (ii) load secure-software for processing in the trusted execution environment, the secure-software comprising instructions that, when executed in the trusted execution environment, cause the secure module to perform operations comprising:
generating a private key and a corresponding public key;
maintaining the private key in the trusted execution environment;
sending the public key and ownership metadata that pertains to the host server to a certifying server that is configured to (i) receive the public key, (ii) verify ownership of the host server by examining ownership records that correspond to the ownership metadata, (iii) in response to verifying ownership of the host server, generate a certificate for the host server using the public key, and (iv) serve the certificate to the host server;
in response to receiving an attestation request for a client device, processing the attestation request by (i) providing, to the client device, the certificate that has been served by the certifying server, and (ii) generating an attestation response using the private key, wherein the attestation response comprises an actual-fingerprint of the secure-software, and wherein the attestation response is used to perform a verification of whether the trusted execution environment is executing the secure-software by verifying whether the actual-fingerprint of the secure-software matches an expected-fingerprint of the secure-software, and to provide a result of the verification for the client device;
after the certificate has been provided to the client device and the result of the verification have been provided for the client device, receiving, from the client device, a request for an encrypted connection with the trusted execution environment; and
after receiving the request for the encrypted connection from the client device, (i) initiating the encrypted connection with the client device, and (ii) communicating with the client device over the encrypted connection.

2. The system of claim 1, wherein the processing of the attestation request is performed once, and communicating with the client device over the encrypted connection occurs as long as the encrypted connection is secured.

3. The system of claim 1, wherein the request for the encrypted connection with the trusted execution environment comprises an initiation message that uses the public key from the certificate provided to the client device.

4. The system of claim 1, wherein initiating the encrypted connection comprises creating a secure endpoint inside of the trusted execution environment.

5. The system of claim 4, wherein the secure endpoint is a Transport Layer Security (TLS) endpoint or a Secure Sockets Layer (SSL) endpoint.

6. The system of claim 4, wherein the host server is configured to maintain multiple different secure endpoints, with each secure endpoint being configured to communicate with a respective different client device.

7. The system of claim 1, wherein the attestation response comprises a copy of the certificate.

8. The system of claim 1, wherein the result of the verification includes a time-stamp of the verification and an expiration time-stamp that indicates when the verification is due to expire.

9. A method performed by a secure module of a host server, for providing secure data transfer with a trusted execution environment that executes secure-software, the method comprising:
generating a private key and a corresponding public key;
maintaining the private key in the trusted execution environment;
sending the public key and ownership metadata that pertains to the host server to a certifying server that is configured to (i) receive the public key, (ii) verify ownership of the host server by examining ownership records that correspond to the ownership metadata, (iii) in response to verifying ownership of the host server, generate a certificate for the host server using the public key, and (iv) serve the certificate to the host server;
in response to receiving an attestation request for a client device, processing the attestation request by (i) providing, to the client device, the certificate that has been served by the certifying server, and (ii) generating an attestation response using the private key, wherein the attestation response comprises an actual-fingerprint of the secure-software, and wherein the attestation response is used to perform a verification of whether the trusted execution environment is executing the secure-software by verifying whether the actual-fingerprint of the secure-software matches an expected-fingerprint of the secure-software, and to provide a result of the verification for the client device;
after the certificate has been provided to the client device and the result of the verification have been provided for the client device, receiving, from the client device, a request for an encrypted connection with the trusted execution environment; and
after receiving the request for the encrypted connection from the client device, (i) initiating the encrypted connection with the client device, and (ii) communicating with the client device over the encrypted connection.

10. The method of claim 9, wherein the processing of the attestation request is performed once, and communicating with the client device over the encrypted connection occurs as long as the encrypted connection is secured.

11. The method of claim 9, wherein the request for the encrypted connection with the trusted execution environment comprises an initiation message that uses the public key from the certificate provided to the client device.

12. The method of claim 9, wherein initiating the encrypted connection comprises creating a secure endpoint inside of the trusted execution environment.

13. The method of claim 9, wherein the attestation response comprises a copy of the certificate.

14. The method of claim 9, wherein the result of the verification includes a time-stamp of the verification and an expiration time-stamp that indicates when the verification is due to expire.

15. A computer-readable media for providing secure data transfer with a trusted execution environment that executes secure-software, the media tangibly storing instructions that, when executed by a host server, cause a secure module of the host server to:
generating a private key and a corresponding public key;
maintaining the private key in the trusted execution environment;
sending the public key and ownership metadata that pertains to the host server to a certifying server that is configured to (i) receive the public key, (ii) verify ownership of the host server by examining ownership records that correspond to the ownership metadata, (iii) in response to verifying ownership of the host server, generate a certificate for the host server using the public key, and (iv) serve the certificate to the host server;

in response to receiving an attestation request for a client device, processing the attestation request by (i) providing, to the client device, the certificate that has been served by the certifying server, and (ii) generating an attestation response using the private key, wherein the attestation response comprises an actual-fingerprint of the secure-software, and wherein the attestation response is used to perform a verification of whether the trusted execution environment is executing the secure-software by verifying whether the actual-fingerprint of the secure-software matches an expected-fingerprint of the secure-software, and to provide a result of the verification for the client device;

after the certificate has been provided to the client device and the result of the verification have been provided for the client device, receiving, from the client device, a request for an encrypted connection with the trusted execution environment; and after receiving the request for the encrypted connection from the client device, (i) initiating the encrypted connection with the client device, and (ii) communicating with the client device over the encrypted connection.

16. The computer-readable media of claim 15, wherein the processing of the attestation request is performed once, and communicating with the client device over the encrypted connection occurs as long as the encrypted connection is secured.

17. The computer-readable media of claim 15, wherein the request for the encrypted connection with the trusted execution environment comprises an initiation message that uses the public key from the certificate provided to the client device.

18. The computer-readable media of claim 15, wherein initiating the encrypted connection comprises creating a secure endpoint inside of the trusted execution environment.

19. The computer-readable media of claim 15, wherein the attestation response comprises a copy of the certificate.

20. The computer-readable media of claim 15, wherein the result of the verification includes a time-stamp of the verification and an expiration time-stamp that indicates when the verification is due to expire.

* * * * *